(12) United States Patent
Suzuki

(10) Patent No.: US 7,130,433 B1
(45) Date of Patent: Oct. 31, 2006

(54) NOISE REDUCTION APPARATUS AND NOISE REDUCTION METHOD

(75) Inventor: Shirou Suzuki, Tokorozawa (JP)

(73) Assignee: Pioneer Electronic Corporation (JP)

( * ) Notice: Subject to any disclaimer, the term of this patent is extended or adjusted under 35 U.S.C. 154(b) by 0 days.

(21) Appl. No.: 09/189,637

(22) Filed: Nov. 10, 1998

(30) Foreign Application Priority Data

Nov. 12, 1997 (JP) .................................. 9-310231

(51) Int. Cl.
*H04B 15/00* (2006.01)

(52) U.S. Cl. ...................................... 381/94.8; 348/622

(58) Field of Classification Search ................ 381/101, 381/102, 104, 106–109, 120, 56–57, 317, 381/73.1, 94.1–94.9, 71.1, 61, 98; 348/618, 348/622, 683
See application file for complete search history.

(56) References Cited

U.S. PATENT DOCUMENTS

| | | | | |
|---|---|---|---|---|
| 4,185,168 A | * | 1/1980 | Graupe et al. .................. 179/1 |
| 4,430,754 A | * | 2/1984 | Ishigaki ...................... 381/94.3 |
| 4,454,609 A | * | 6/1984 | Kates .......................... 381/68 |
| 4,467,287 A | * | 8/1984 | Aylward ...................... 330/126 |
| 4,553,257 A | * | 11/1985 | Mori et al. .................... 381/57 |
| 4,899,389 A | * | 2/1990 | Amazawa .................. 381/94.8 |
| 4,901,150 A | * | 2/1990 | Klingelhofer et al. ....... 358/167 |
| 4,940,977 A | * | 7/1990 | Mandell ....................... 341/13 |
| 5,170,437 A | * | 12/1992 | Strahm ........................ 381/106 |
| 5,253,299 A | * | 10/1993 | Ishida et al. .................... 381/13 |
| 5,293,578 A | * | 3/1994 | Nagami et al. ........... 381/71.14 |
| 5,315,660 A | * | 5/1994 | Anderson et al. ............. 381/13 |
| 5,388,159 A | * | 2/1995 | Sakata .......................... 381/61 |
| 5,734,987 A | * | 3/1998 | Shiono et al. .............. 455/570 |
| 5,926,334 A | | 7/1999 | Suzuki |
| 6,009,129 A | * | 12/1999 | Kenney et al. ............. 375/346 |

FOREIGN PATENT DOCUMENTS

JP 359119511 A * 7/1984

OTHER PUBLICATIONS

IBM Technical, Recording or Broadcasting Automatic Gain Control Compressor. May 1968.*

* cited by examiner

*Primary Examiner*—Vivian Chin
*Assistant Examiner*—Lun-See Lao
(74) *Attorney, Agent, or Firm*—Finnegan, Henderson, Farabow, Garrett & Dunner LLP

(57) ABSTRACT

An apparatus for reducing noise component contained in an input signal has: a detecting device for detecting a level of the noise component; an adjusting device for adjusting a level of the input signal so as to make the level of the noise component equal to or lower than a predetermined threshold level; a reducing device for reducing a signal component of the adjusted input signal whose level is equal to and lower than the predetermined threshold level; and a restoring device for restoring a level of the adjusted input signal to the level of the input signal that has not been adjusted by the adjusting device yet.

14 Claims, 7 Drawing Sheets

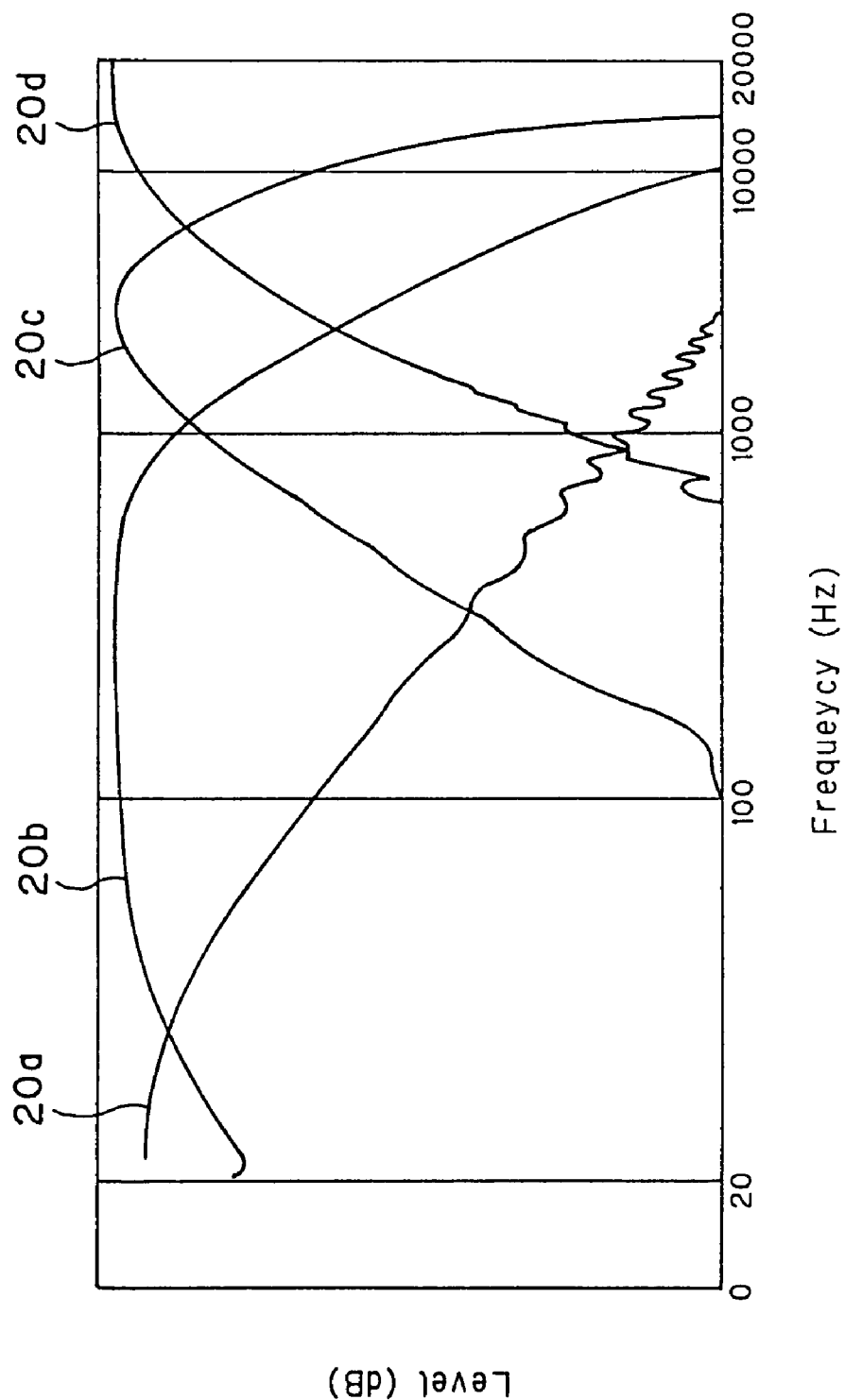

NOISE REDUCTION APPARATUS AND NOISE REDUCTION METHOD

BACKGROUND OF THE INVENTION

1. Field of the Invention

The present invention relates to a noise reduction apparatus and a noise reduction method which is used for audio reproducing system containing various types of audio components.

2. Description of the Related Art

A noise reduction technique is used for a tape deck in order to reduce hiss noise in sound. In this noise reduction technique, the level of the sound in middle and high frequency bands is compressed when recording, and the compressed sound is expanded when reproducing. In this manner, hiss noise contained in the sound from the tape can be reduced. However, this technique has a disadvantage that it is needed to compress the sound level when recording. That is, this noise reduction cannot be effected for the sound that is not compressed.

In recent years, there are various types of audio apparatuses, such as a CD (Compact Disk) player, a cassette desk, a tuner, an MD (Mini Disk) player, etc. Therefore, an audio reproduction system which contains these audio apparatuses as audio components and controls the reproduction of these audio components has been developed. In such an audio reproducing system, all the reproducing signals output from the audio components are passed through one common signal processing circuit, and then, these signals are sent to output devices such as speakers or the like.

In such an audio reproducing system, the noise reduction is needed in order to make sound clearer. However, as the audio reproducing system has different types of audio components, the different noise reduction circuit or device is needed for every audio component. Because, in order to reduce noise effectively, it is necessary to set parameters (e.g., a threshold level for cutting noise) of the noise reduction circuit or device in such a condition that these parameters are matched the level of the reproducing signal output from each audio component. The levels of the reproducing signals output from the respective audio components are different from each other. Therefore, a plurality of noise reduction circuits or devices are needed depending on the number of the types of audio components. As a result, the construction of the audio reproducing system becomes complex. In addition, if one common noise reduction circuit or device, whose parameters are set to match one of the audio components, is used, it is difficult to achieve optimum noise reduction for every audio components.

SUMMARY OF THE INVENTION

It is therefore an object of the present invention to provide a noise reduction apparatus and a noise reduction method wherein, if a plurality of input signals each having different level are input, noise components contained in the respective input signals can be effectively reduced.

According to a noise reduction apparatus of the present invention, the above mentioned object can be achieved. The noise reduction apparatus of the present invention has: a detecting device for detecting a level of the noise component; an adjusting device for adjusting a level of the input signal so as to make the level of the noise component equal to or lower than a predetermined threshold level; a reducing device for reducing a signal component of the adjusted input signal whose level is equal to and lower than the predetermined threshold level; and a restoring device for restoring a level of the adjusted input signal to the level of the input signal that has not been adjusted by the adjusting device yet.

The reducing device can reduce the signal component of the input signal whose level is equal to and lower than the predetermined threshold level. Therefore, if the level of the noise component contained in the input signal is equal to or lower than the predetermined threshold level, the noise component can be reduced by the reducing device.

If the level of the noise component contained in the input signal is higher than the predetermined threshold level, the adjusting device adjusts the level of the input signal so as to make the level of this noise component equal to or lower than the predetermined threshold level. Therefore, this noise component can be reduced by the reducing device.

Thus, if various input signals whose levels are different from each other are input, the noise components contained in these respective input signals can be effectively reduced by one reducing device. Furthermore, as the noise components contained in these respective input signals can be effectively reduced by one reducing device, it is possible to simplify the construction of the noise reduction apparatus.

The detecting device may include: an extracting device for extracting a high frequency component of the input signal; a rectifying device for rectifying the extracted high frequency component; an envelope generating device for generating an envelope signal of the extracted high frequency component; and a level analyzing device for detecting a lowest level of the envelope signal.

The property of the high frequency component of the input signal is very similar to the property of a pulse signal. Therefore, if the component having the lowest level is detected from the high frequency component of the input signal, this lowest level component may be considered as the noise component. Thus, the level of the noise component can be easily and accurately detected.

The detecting device may include a sound existing part detecting device for detecting a sound existing part of the input signal; and a noise level detecting device for detecting the level of the noise component which is contained in the sound existing part. The sound existing part means a part of the input signal where sound, such as music, voice or the like, is actually existing. Since the sound existing part of the input signal is detected and the noise level detection is only performed on the sound existing part, it is possible to detect the level of the noise component accurately.

The reducing device may include: a dividing device for dividing the adjusted input signal into a plurality of divisional components whose frequency bands are different from each other; a plurality of signal level detecting devices, each of which detects a level of one of the divisional components; a plurality of attenuating devices, each of which attenuates one of the divisional components on the basis of the detected level of the corresponding divisional component; a mixing device for mixing all of the attenuated divisional components. As the input signal is divided into a plurality of divisional components whose frequency bands are different from each other, it is possible to sufficiently reduce the noise component.

The adjusting device may include an attenuator, and the restoring device may include an amplifier. In this case, the amplifier may amplify the adjusted input signal by using an inverse number of an attenuation factor of the attenuator as an amplification factor. Therefore, the amplification factor of the amplifier can be easily calculated.

According to a noise reduction method of the present invention, the above mentioned object can be also achieved.

The noise reduction method has the processes of: detecting a level of the noise component; adjusting a level of the input signal so as to make the level of the noise component equal to or lower than a predetermined threshold level; reducing a signal component of the adjusted input signal whose level is equal to and lower than the predetermined threshold level; and restoring a level of the adjusted input signal to the level of the input signal that has not been adjusted in the adjusting process yet.

The detecting process may include the processes of: extracting a high frequency component of the input signal; rectifying the extracted high frequency component; generating an envelope signal of the extracted high frequency component; and detecting a lowest level of the envelope signal.

The detecting process may include the processes of: detecting a sound existing part of the input signal; and detecting the level of the noise component which is contained in the sound existing part.

The adjusting process may include the processes of: determining whether or not the level of the noise component is higher than the predetermined threshold level; and adjusting a level of the input signal so as to make the level of the noise component equal to or lower than the predetermined threshold level if it is determined in the determining process that the level of the noise component is higher than the predetermined threshold level.

The reducing process may include the processes of: dividing the adjusted input signal into a plurality of divisional components whose frequency bands are different from each other; detecting a level of each of the divisional components; attenuating each of the divisional components on the basis of the detected level of the corresponding divisional component; mixing all of the attenuated divisional components.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is a graph showing frequency properties of the noise reduction portion.

DETAILED DESCRIPTION OF THE PREFERRED EMBODIMENTS

Referring to the accompanying drawings, an embodiment of the present invention will be now described. In the description set forth hereinafter, a noise reduction apparatus is adapted for an information reproducing apparatus having a tuner, a CD player and a cassette deck.

First, the configuration of the information reproducing apparatus will be described with reference to FIGS. 1 through 3.

Figure 1:
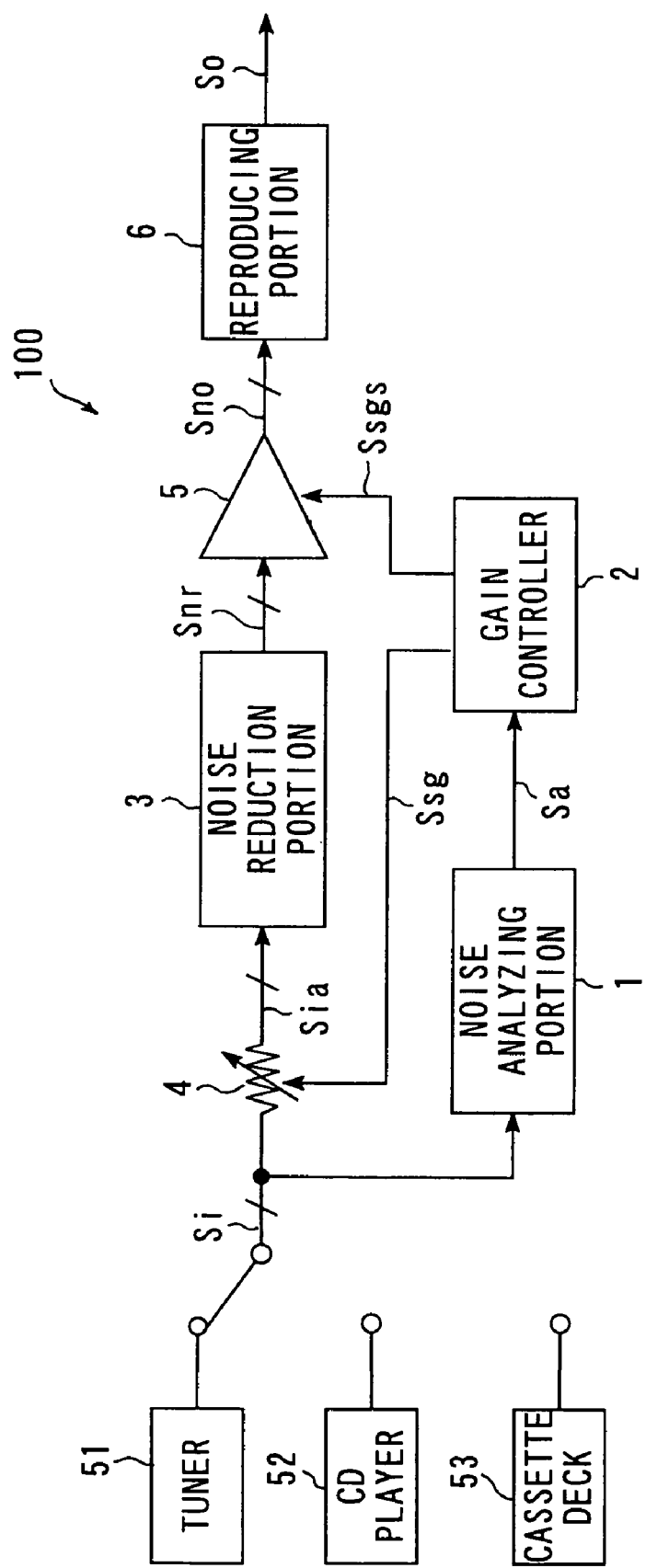
FIG. 1 is a block diagram showing a configuration of an information reproducing apparatus of an embodiment of the present invention.

As shown in FIG. 1, an information reproducing apparatus 100 has a tuner 51, a CD player 52, a cassette deck 53, a noise analyzing portion 1, a gain controller 2, a noise reduction portion 3, an attenuator 4, an amplifier 5 and a reproducing portion 6.

Figure 2:
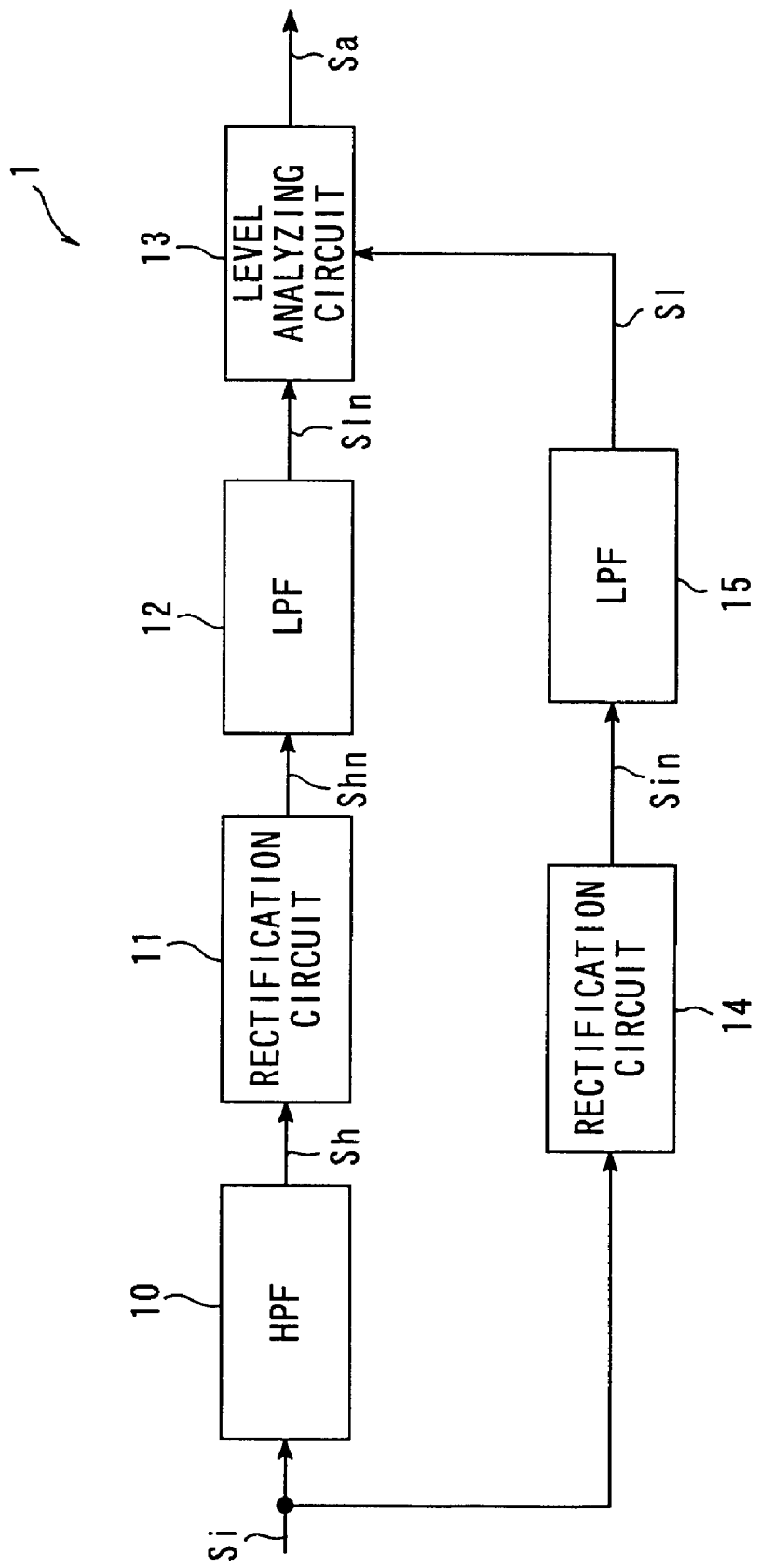
FIG. 2 is a block diagram showing a configuration of a noise analyzing portion of the information reproducing apparatus.

As shown in FIG. 2, the noise analyzing portion 1 has an HPF (High Pass Filter) 10, a first rectification circuit 11, a first LPF (Low Pass Filter) 12, a level analyzing circuit 13, a second rectification circuit 14, and a second LPF 15.

Figure 3:
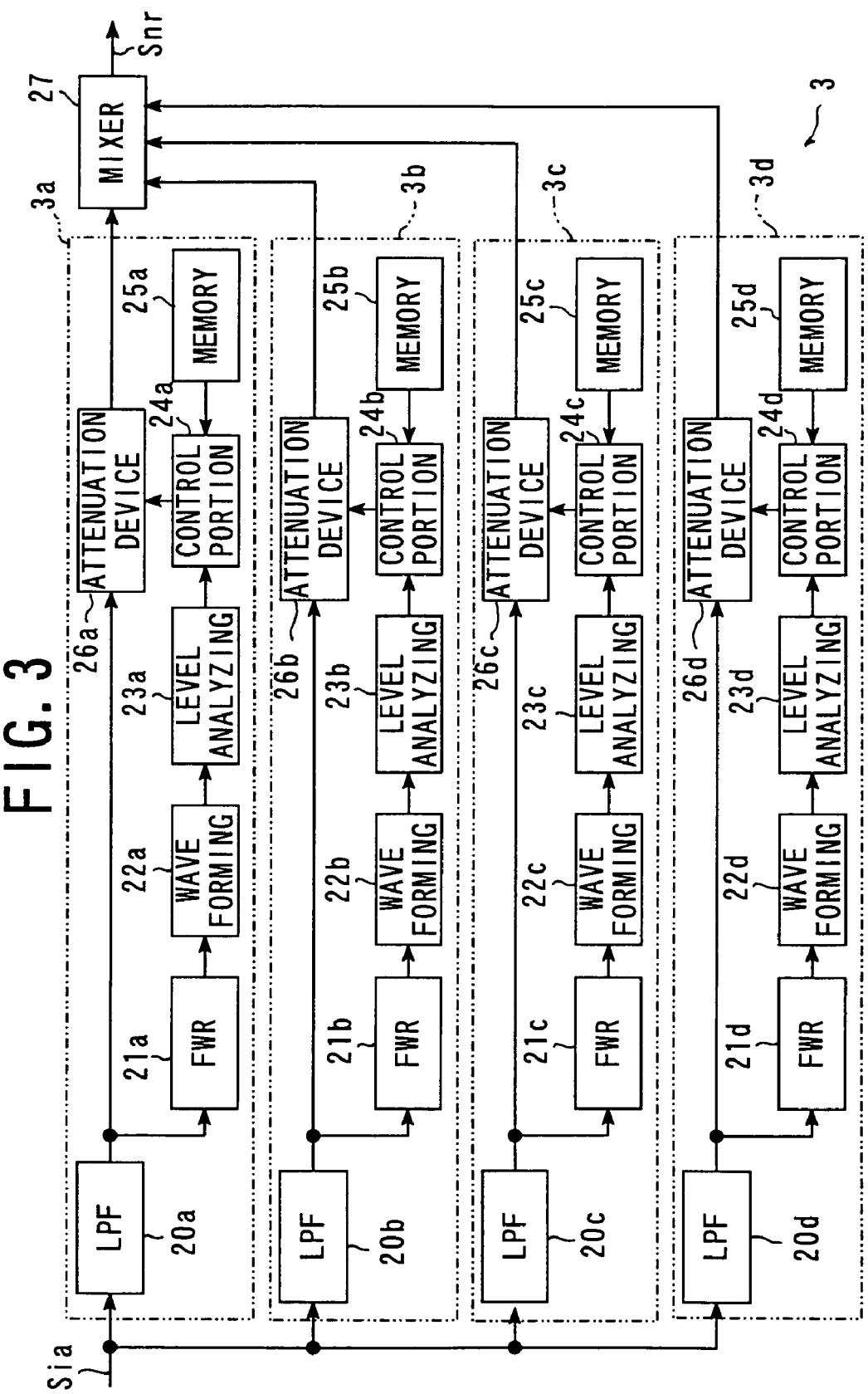
FIG. 3 is a block diagram showing a configuration of a noise reduction portion of the information reproducing apparatus.

As shown in FIG. 3, the noise reduction portion 3 has four NR (Noise Reduction) sections 3a, 3b, 3c and 3d and a mixer 27.

The first NR section 3a has an LPF 20a, an FWR (Full Wave Rectification) portion 21a, a wave forming portion 22a, a level detecting device 23a, a control portion 24a, a memory 25a and an attenuating device 26a.

The second NR section 3b has a BPF 20b, an FWR portion 21b, a wave forming portion 22b, a level detecting portion 23b, a control portion 24b, a memory 25b and an attenuating device 26b.

The third NR section 3b has a BPF 20c, an FWR portion 21c, a wave forming portion 22c, a level detecting portion 23c, a control portion 24c, a memory 25c and an attenuating device 26c.

The fourth NR section 3d has an HPF 20d, an FWR portion 21d, a wave forming portion 22d, a level detecting portion 23d, a control portion 24d, a memory 25d and an attenuating device 26d.

Next, an operation of the information reproducing apparatus 100 will be described. In addition, in the following operation, all of the signals are digital signals, and all of the processes are performed in digital.

First, an operation of the whole of the information reproducing apparatus 100 will be described with reference to FIG. 1.

In FIG. 1, when an input signal (i.e., reproducing signal) Si is input from one of the audio components, namely, the tuner 51, the CD player 52 and the cassette deck 53, into the noise analyzing portion 1, the noise analyzing portion 1 detects a level of noise contained in the input signal Si, and generates a level detecting signal Sa. This signal Sa is fed into the gain controller 2.

Next, the gain controller 2 generates a first control signal Ssg on the basis of the level detecting signal Sa, and feeds the control signal Ssg to the attenuator 4. In the attenuator 4, the control signal Ssg is used for adjusting the level of the whole of the input signal Si in order to enable the noise reduction portion 3 to effectively reduce the noise level of the input signal Si. Furthermore, the gain controller 2 generates a second control signal Ssgs, and feeds this to the amplifier 5. In amplifier 5, the control signal Ssgs is used for adjusting the level of the whole of the input signal Si so as to restore this level to the former level (i.e., the level of the input signal Si that has not been adjusted by the attenuator 4 yet).

The attenuator 4 adjusts (e.g. reduces) the level of the whole of the input signal Si, and feeds this signal as an adjusted input signal Sia to the noise reduction portion 3.

Next, the noise reduction portion 3 divides the adjusted input signal Sia into several predetermined frequency bands, and reduces noise contained in the adjusted input signal Sia for each frequency band. The resultant signal is fed as a noise reduced signal Snr into the amplifier 5. In addition, the level of the whole of the adjusted input signal Sia is the same as the level of the whole of the noise reduced signal Snr.

Next, the amplifier 5 adjusts (e.g. increases) the level of the whole of the noise reduced signal Snr so as to make this level equal to the level of the whole of the input signal Si, and feeds this adjusted signal as an amplified signal Sno to the reproducing portion 6. In this manner, the noise component contained in the input signal Si output from each audio component can be reduced while keeping the whole level of this input signal Si constant.

Finally, the reproducing portion 6 decodes the amplified signal Sno, and outputs the decoded signal as output signal So.

Next, an operation of the noise analyzing portion 1 will be described in detail with reference to FIGS. 2 through 4.

The rectification circuit 14 and the LPF 15 operate to generate an extracted signal Sl, which is used for discriminating between sound existing parts and blank parts of the input signal Si. In addition, the sound existing part means a part where the sound is actually existing. The blank part means a part where the sound does not exist. On the other hand, the HPF 10, the rectification circuit 11, the LPF 12 and the level analyzing circuit 13 operate to generate the aforementioned level detecting signal Sa.

In FIG. 2, the input signal Si is fed into the HPF 10 and the rectification circuit 14. The rectification circuit 14 generates a rectified signal Sin. It is desirable that a full wave rectification circuit is used as the rectification circuit 14.

Then, the LPF 15 extracts the low frequency component of the rectified signal Sin (i.e., generates an envelope signal representing the envelope of the rectified signal Sin), and feeds this signal as the extracted signal Sl to the level analyzing circuit 13.

Figure 5A:
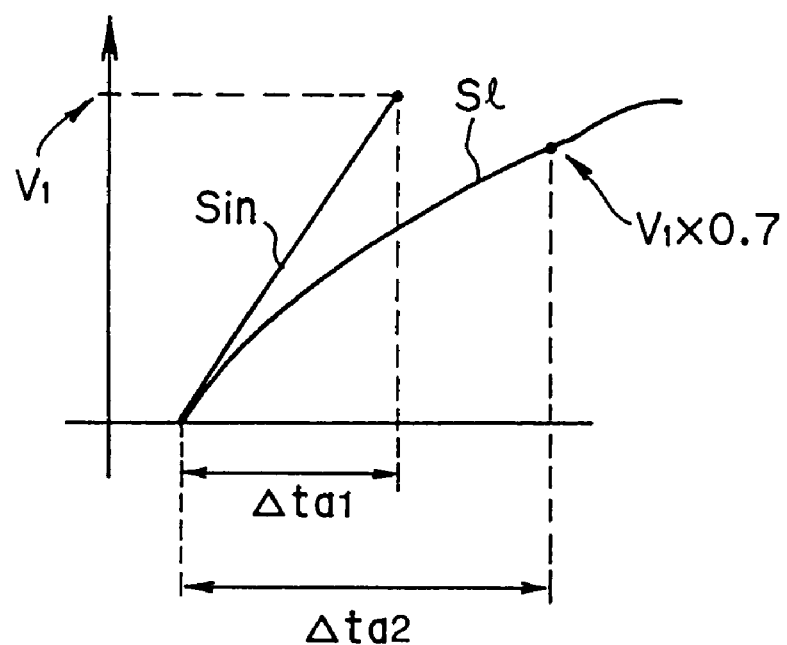
FIG. 5A is a graph showing an attack time of an LPF of the noise analyzing portion.

In the LPF 15, its attack time is set at about 1 millisecond and its release time is set within the range of about 100 to 1000 millisecond. Here, the attack time and the release time will be explained with reference to FIG. 5. As shown in FIG. 5A, the attack time indicates a delay of the increasing of the level of the extracted signal S, as compared with the increasing of the level of the rectified signal Sin. Concretely, the attack time indicates a time period $\Delta ta2$ from a rise time of the rectified signal Sin to a time that the level of the extracted signal Sl reaches 70% of a predetermined level V1 of the rectified signal Sin. In addition, the time period $\Delta ta1$ indicates a rise time of the rectified signal Sin to a time that the level of the rectified signal Sin reaches the predetermined level V1.

Figure 5B:
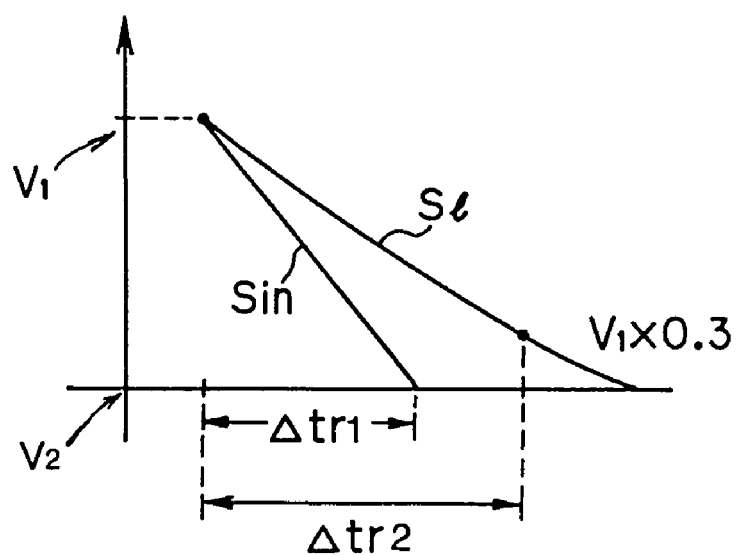
FIG. 5B is a graph showing a release time of an LPF of the noise analyzing portion.

The release time indicates a delay of the decreasing of the level of the extracted signal Sl, as compared with the decreasing of the level of the rectified signal Sin, as shown in FIG. 5B. Concretely, the release time indicates a time period $\Delta tr2$ from a fall time of the rectified signal Sin to a time that the level of the extracted signal Sl reaches 30% of the predetermined level V1 of the rectified signal Sin. In addition, the time period $\Delta tr1$ indicates a fall time of the rectified signal Sin to a time that the level of the rectified signal Sin reaches a predetermined level V2, such as a zero level.

Generally, in order to enhance the following response or the tracking response of the LPF, it is desirable to make the attack time and the short release time shorter. Concretely, in FIG. 5A, it is desirable to make the time period $\Delta ta2$ closer to the time period $\Delta ta1$. In FIG. 5B, t is desirable to make the time period $\Delta tr2$ closer to the time period $\Delta tr1$.

When the input signal Si is fed into the HPF 10, the low frequency component of the input signal Si is cut off by the HPF 10. Thus, the high frequency component is passed though the HPF 10, and fed as a high pass signal Sh into the rectification circuit 11. A second, third or fourth-order digital high pass filter is used as the HPF 10, and its cut-off frequency is set at about 10 through 18 kHz. Furthermore, in consideration of the case that the input signal Si is a music signal from the tuner 51, the HPF 10 may attenuate the input signal Si of 19 kHz, which corresponds to the frequency of a test tone signal of the FM stereo tuner (this signal is not actually needed for reproduction of sound.).

As mentioned above, in the analyzing portion 1, the high frequency component of the input signal Si is used for the noise level detection. Therefore, it is easy and accurate to detect the noise component from the input signal Si. This is because the property of the high frequency component of the sound existing part of the music signal is very similar to the property of a pulse signal, and therefore, if the component having the lowest level is extracted from the high frequency component of the input signal Si, this lowest level component may be considered as the noise component.

Next, the rectification circuit 11 rectifies the high pass signal Sh, and generates a rectified signal Shn. It is desirable that a full wave rectification circuit is used as the rectification circuit 11.

Next, the LPF 12 extracts the low frequency component from the rectified signal Shn (i.e., generates an envelope signal of the rectified signal Shn), and feeds this signal as an extracted signal Sln into the level analyzing circuit 13.

Like the LPF 15, the attack time of the LPF 12 is set at about 1 millisecond in order to detect the noise level accurately. On the other hand, the release time of the LPF 12 is shorter than that of the LPF 15 in order to accurately detect the noise that appears in the rectified signal Shn in a short time. For example, this release time is set within the range of about 10 to 100 millisecond.

Next, the level analyzing circuit 13 detects the sound existing part of the input signal Si by using the extracted signal Sl generated by the rectification circuit 14 and the LPF 15 in the following manner. The level analyzing circuit 13 compares the level of the extracted signal Sl with the level of a system noise. The system noise is noise that occurs from the rectification circuit 14 and the LPF 15 when no input signal is input to the rectification circuit 14 and the LPF 15. If the level of the extracted signal Sl is higher than the level of the system noise, the level analyzing circuit 13 determines that the sound existing part is now being input. On the other hand, if the level of the extracted signal Sl is equal to or lower than the level of the system noise, the level analyzing circuit 13 determines that the blank part is being input. In addition, in order to make this determination easy and accurate, the attack time and the release time of the LPF 15 are set at the aforementioned values, respectively, While the sound existing part is being input, the level analyzing circuit 13 detects the level of noise contained in the extracted signal Sln which is fed from the LPF 12 in the following manner. First, the level analyzing circuit 13 detects the level of the extracted signal Sln every predetermined sampling time period. Next, the level analyzing circuit 13 compares the level of the extracted signal Sln that is detected in one sampling time period with the level of the extracted signal Sln that is detected in the next sampling time period, and select a lower one. Next, the level analyzing circuit 13 sets the selected level as a level of a level detecting signal Sa, and outputs this level detecting signal Sa. By repeating these operations, the level of the level detecting signal Sa becomes low, and approaches the noise level of the input signal Si, as shown in FIG. 4. This level finally becomes equal to the noise level of the input signal Si. More concretely, as shown in FIG. 4, the maximum level Vrm of the level range within which the level analyzing circuit 13 can normally perform the analysis of the extracted signal Sln is initially set as the initial level of the level detecting signal Sa. That is, the level analyzing circuit 13 initially outputs a signal having the maximum level Vrm as the level detecting signal Sa. Thereafter, if the extracted signal Sln whose level is lower than the maximum level Vrm is input, the level analyzing circuit 13 holds this level. Furthermore, if the extracted signal Sln whose level is lower than the previous level is input, the level analyzing circuit 13 holds this level. In this manner, the level detecting signal Sa is gradually lowered and approaches the noise level of the input signal Si.

In addition, the aforementioned process of the level analyzing circuit 13 is performed on the premise that the noise level of the input signal Si is constant unless the output source of the input signal Si is changed. For example, while the input signal Si is being input from the cassette deck 52, the level analyzing circuit 13 operates on the premise that the noise level of this input signal Si does not change. However, there is a case that the noise level of the input signal Si changes while the input signal Si is input from the one audio component (i.e, the audio component is not changed). In this case, a couple of level analyzing circuits may be prepared. These circuits operate in the following manner. The first level analyzing circuit generates the level detecting signal, and supplies this signal to the gain controller 2. At first, the first level analyzing circuit keeps the level of this level detecting signal. On the other hand, the second level analyzing circuit renews the level detecting signal frequently (e.g., every about 4 through 5 second), and then, the level of the level detecting signal generated by the second level analyzing circuit is compared with the level of the level detecting signal generated by the first level analyzing circuit. If the level of the level detecting signal generated by the second level analyzing circuit is higher than the level of the level detecting signal generated by the first level analyzing circuit, and if this condition continues, the level detecting signal to be supplied to the gain controller 2 is switched from the level detecting signal generated by the first level analyzing circuit to the level detecting signal generated by the second level analyzing circuit.

Next, an operation of the gain controller 2 will be described. The gain controller 2 generates the control signal Ssg which is used for setting the attenuation factor of the attenuator 4 and the control signal Ssgs which is used for setting the amplification factor of the amplifier 5.

The gain controller 2 compares a threshold level Vnref to the level Va of the level detecting signal Sa. As described later, the threshold level Vnref is set in accordance with an attenuation property, which is stored in the memory 25$d$ of the fourth NR section 3$d$ of the noise reduction portion 3, and which is used for attenuating the high frequency component of the adjusted input signal Sia.

If the level Va is equal to or lower than the threshold level Vnref, namely, $$Va \leq Vnref, \quad (1)$$

the gain controller 2 generates the control signals Ssg and Ssgs so as to set the attenuation factor of the attenuator 4 at zero and set the amplification factor of the amplifier 5 at zero. That is, the gain controller 2 generates the control signals Ssg and Ssgs such that the attenuator 4 does not attenuate the adjusted input signal Sia and the amplifier 5 does not amplify the noise reduced signal Snr. This is because, if Va≤Vnref, the noise level of the input signal Si is within the level range in which the noise reduction portion 3 can effectively reduce the noise contained in the input signal Si.

On the other hand, if the level Va is higher than the threshold level Vnref, namely, $$Va > Vnref, \quad (2)$$

the gain controller 2 generates the control signal Ssg so as to set the attenuation factor Ga in accordance with the following equation (3):

$$Ga = Vnref/Va, \quad (3)$$

and generates the control signal Ssgs so as to set the amplification factor Gb in accordance with the following equation (4):

$$Gb = 1/Ga = Va/Vnref. \quad (4)$$

This is because, if Va>Vnref, the noise level of the input signal Si exceeds the level range in which the noise reduction portion 3 can effectively reduce the noise contained in the input signal Si, and therefore, it is necessary to reduce this noise level to a certain level included in the level range within which the noise reduction portion 3 can effectively reduce the noise contained in the input signal Si.

Furthermore, if the level Va is equal to or higher than the maximum level Vrm of the level range within which the level analyzing circuit 13 (i.e., the information reproducing apparatus 100) can normally performed, namely, $$Va \geq Vrm, \quad (5)$$

the gain controller 2 generates the control signal Ssg so as to set the attenuation factor Ga in accordance with the following equation (6):

$$Ga = Vnref/Vrm(=\text{constant}), \quad (6)$$

and generates the control signal Ssgs so as to set the amplification factor Gb in accordance with the following equation (7):

$$Gb = 1/Ga = Vrm/Vnref. \quad (7)$$

If Va≥Vrm, the noise level of the input signal Si exceeds the noise level range within which the information reproducing apparatus 100 can effectively perform the noise reduction process. However, in this case, the noise contained in the input signal Si is reduced by using the maximum attenuation factor in order to reduce the noise as much as possible.

Next, the setting of the attenuation factor and the amplification factor under the control of the gain controller 2 will be described in detail with reference to FIG. 4.

When the gain controller 2 sets the attenuation factor Ga of the attenuator 4 by using the control signal Ssg, the gain controller 2 does not set the attenuation factor at a stroke.

Figure 4:
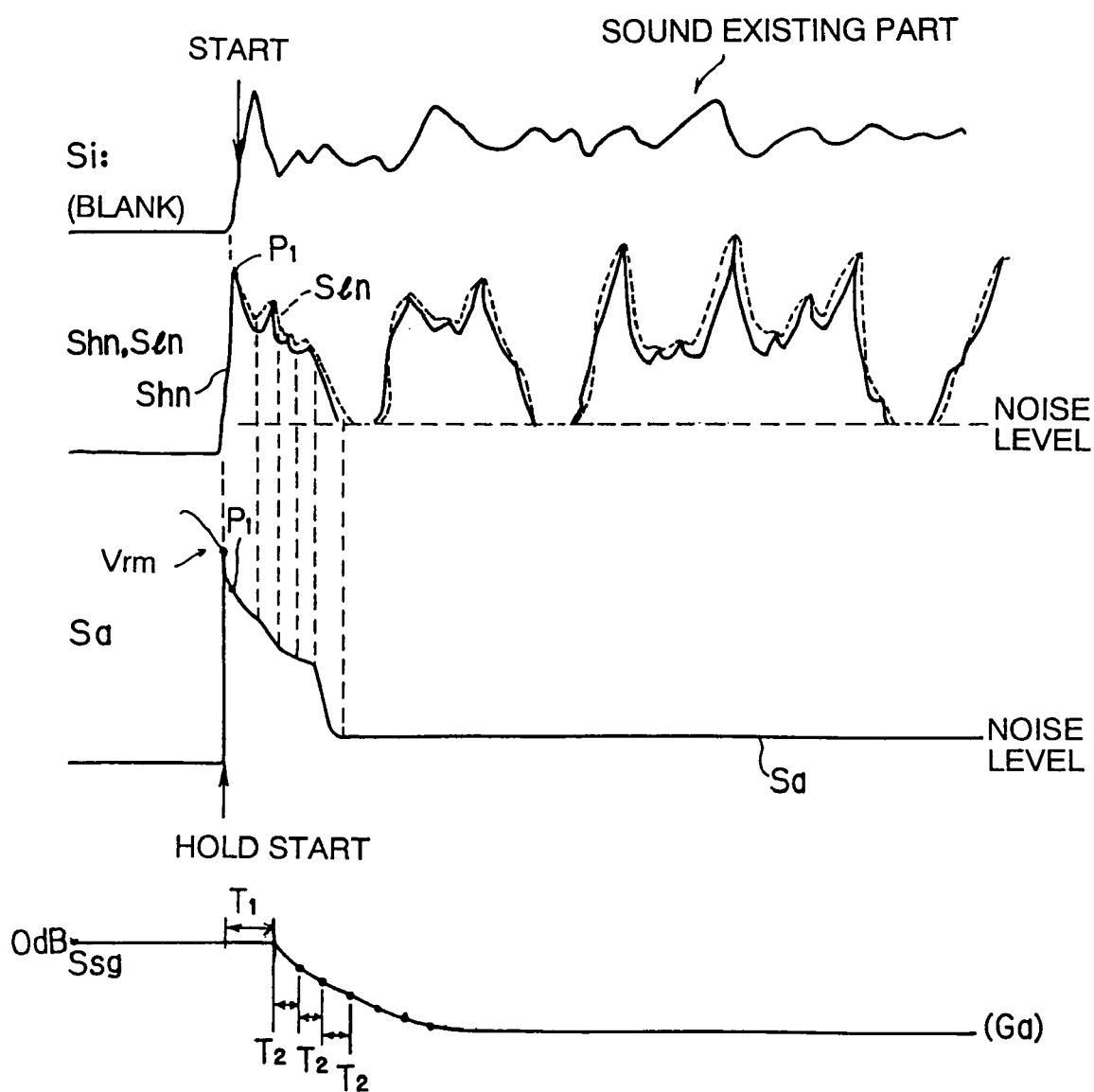
FIG. 4 is a timing chart showing wave forms of signals in the noise analyzing portion.

The gain controller 2 sets the attenuation factor in such a manner that the attenuation factor gradually approaches the Ga, as shown in FIG. 4. Similarly, the gain controller 2 sets the amplification factor in such a manner that the amplification factor gradually approaches the Gb. Therefore, it is possible to remove the feeling of the change of sound level. (If the sound level quickly changes, the change of the sound level appears in the final sound signal. This causes degradation of the sound quality.)

For example, as shown in FIG. 4, the gain controller 2 begins to change the attenuation factor after a time period T1 (e.g. about 100 through 1000 millisecond) has passed since the gain controller 2 begins to sample the level detecting signal Sa. Thereafter, the gain controller 2 changes the attenuation factor every about 10 through 100 millisecond, and the amount of the change of the attenuation factor is, for example, −0.5 dB for each action.

Similarly, the gain controller 2 begins to change the amplification factor after a predetermined time period (e.g. about 100 through 1000 millisecond) has passed since the gain controller 2 begins to sample the level detecting signal Sa. Thereafter, the gain controller 2 changes the amplification factor every about 10 through 100 millisecond, and the amount of the change of the amplification factor is, for example, 0.5 dB for each action.

Next, an operation of the noise reduction portion 3 will be described with reference to FIGS. 3, 6 and 7.

In the noise reduction portion 3, the adjusted input signal Sia is divided into four components by the filters of the NR sections 3a–3d, and then, the level of each divided signal is detected, and then, each divided signal is attenuated by using a predetermined attenuation property, and then, the divided signals are mixed, and then, the mixed signal is output as the noise reduced signal Snr.

More concretely, in the first NR section 3a, the LPF 20 extracts the low frequency component of the adjusted input signal Sia, and feeds this component into the attenuating device 26a and the FWR portion 21a. The frequency property of the LPF 20a is set at a predetermined property, as shown in FIG. 6.

Next, the FWR portion 21a performs the full wave rectification on the signal fed from the LPF 20a.

Next, the signal rectified by the FWR portion 21a is fed into the wave forming portion 22a. The wave forming portion 22a operates as an LPF to detect the envelop of this rectified signal. Namely, the wave forming portion 22 generates the envelope signal on the basis of the predetermined attack time and release time.

Here, the wave forming portion 22a serves to prevent the level of the rectified signal from changing quickly. If the level of the rectified signal changes quickly, the level detecting device 23a cannot follow this change. Further, if the attenuating device quickly performs the attenuation, the change of the sound level becomes noticeable. These problem are solved by the wave forming portion 22a.

Next, the signal is fed as a wave formed signal from the wave forming portion 22a to the level detecting device 23a. Then, the level detecting device 23a detects the level of the wave formed signal.

Next, the control portion 24a controls the attenuating device 26a on the basis of the detected level of the wave formed signal and the attenuating property which is pre-stored in the memory 25a.

In the second NR section 3b, the BPF 20b extracts the middle frequency component of the adjusted input signal Sia, and feeds this component into the attenuating device 26b and the FWR portion 21b. The frequency property of the BPF 20b is set at a predetermined property, as shown in FIG. 6.

Next, like the first NR section 3a, the full wave rectification, the wave formation and the level detection are performed on the extracted component by the FWR portion 21b, the wave forming portion 22b and the level detecting device 23b. Next, the control portion 24b controls the attenuating device 26b on the basis of the detected level and the attenuating property which is pre-stored in the memory 25b.

In the third NR section 3c, the BPF 20c extracts the middle frequency component of the adjusted input signal Sia, and feeds this component into the attenuating device 26c and the FWR portion 21c. The frequency property of the BPF 20c is set at a predetermined property, as shown in FIG. 6.

Next, like the first NR section 3a, the full wave rectification, the wave formation and the level detection are performed on the extracted component by the FWR portion 21c, the wave forming portion 22c and the level detecting device 23c. Next, the control portion 24c controls the attenuating device 26c on the basis of the detected level and the attenuating property which is pre-stored in the memory 25c.

In the fourth NR section 3d, the HPF 20d extracts the high frequency component of the adjusted input signal Sia, and feeds this component into the attenuating device 26d and the FWR portion 21d. The frequency property of the HPF 20d is set at a predetermined property, as shown in FIG. 6.

Next, like the first NR section 3a, the full wave rectification, the wave formation and the level detection are performed on the extracted component by the FWR portion 21d, the wave forming portion 22d and the level detecting device 23d. Next, the control portion 24d controls the attenuating device 26d on the basis of the detected level and the attenuating property which is pre-stored in the memory 25d.

Then, all of the output signals obtained from the respective attenuating devices 26a–26d are mixed by the mixer 27, and this mixed signal is fed as the noise reduced signal Snr into the amplifier 5.

Thereafter, the amplifier 5 amplifies the noise reduced signal Snr such that the whole level of the noise reduced signal Snr is equal to the whole level of the input signal Si.

In addition, if there is a necessity that the number of circuits arranged in the information reproducing apparatus 100 is decreased in order to make the construction simple, it is possible to remove the first NR section 3a of the noise reduction portion 3. This is because the human audibility is not sharp in the low frequency band.

Next, the attenuation properties AP1 through AP3 stored in the memories 25a–25d will be described with reference to FIG. 7. In FIG. 7, the abscissa represents the input level of the divided component of the adjusted input signal Sia (FIG. 3), and the ordinate represents the amount of the attenuation controlled by each control portion 24a–24d. As seen from FIG. 7, a plurality of attenuation properties AP1–AP3 are used, and these attenuation properties AP1–AP3 correspond to the frequency bands set by the BPFs 20b, 20c and HPF 20d, respectively.

Figure 7:
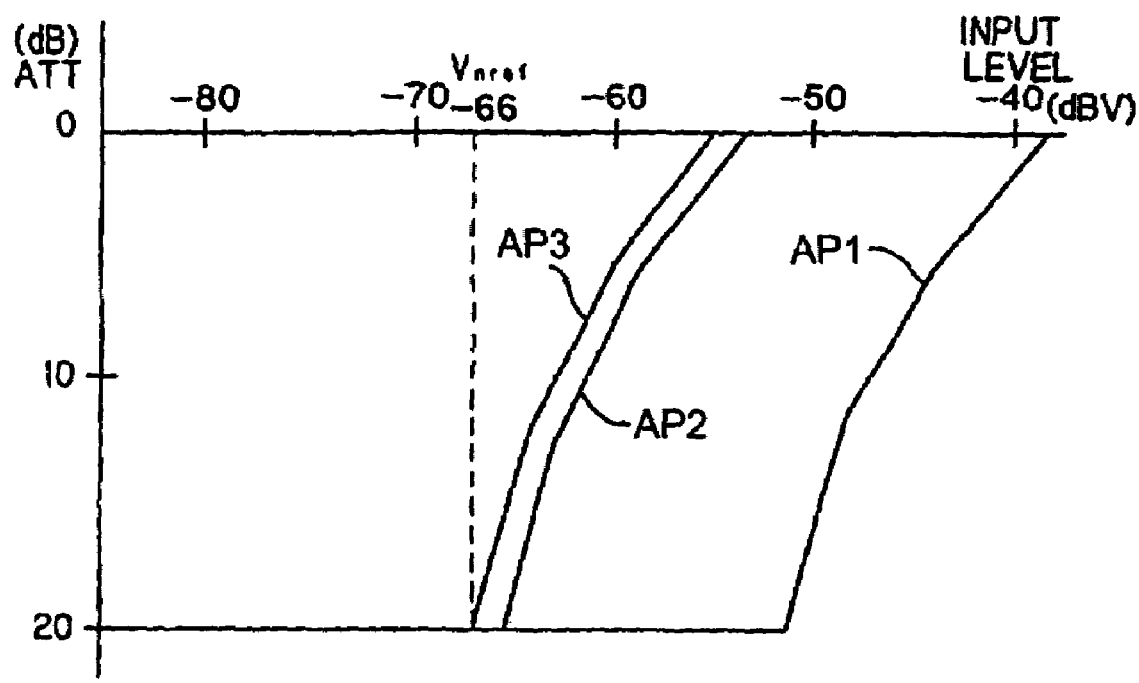
FIG. 7 is a graph showing attenuation properties of the noise reduction portion.

As shown in FIG. 7, if the input level of the divided component of the adjusted input signal Sia is equal to or lower than −66 dB, the amount of the attenuation is maximum, namely, 20 dB. This means that, if the noise level of the input signal Si (i.e., the level of the level detecting signal Sa) is equal to or lower than −66 dB, the noise reduction portion 3 can effectively reduce the noise contained in the input signal Si. Therefore, the maximum level Vnref to be used as the reference value for setting the attenuation factor and the amplification factor is set at −66 dB. Accordingly, if the noise level of the input signal Si is equal to or lower than −66 dB, the attenuator 4 does not perform attenuation. As a result, the input signal Si is input to the noise reduction portion 3 without changing its whole level, and the noise component contained in the input signal Si can be effectively reduced by the noise reduction portion 3. On the other hand, if the noise level of the input signal Si is higher than −66 dB, the noise reduction portion 3 cannot effectively reduce the noise. In this case, the attenuator 4 reduces (attenuates) the whole level of the input signal Si before this signal is fed into the noise reduction portion 3. As the whole level of the input signal Si is reduced, the noise level of the input signal Si is also reduced, and this noise level becomes equal to or lower than −66 dB. Consequently, the noise component contained in the input signal Si can be effectively reduced by the noise reduction portion 3.

In addition, as seen from the attenuation property AP3 shown in FIG. 7, the input level is gradually lowered in the range of −55 dB to −66 dB. Therefore, it is possible to prevent the sound level from changing suddenly, and the feeling of the change of sound level can be removed. For the same reason, the input levels are gradually lowered with respect to the attenuation properties AP1 and AP2, as shown in FIG. 7.

In addition, although the maximum level Vnref is set at −66 dB, the present invention is not limited to this. It is possible to change this level depending on a modification of the information reproducing apparatus 100.

According to the information reproducing apparatus 100 of the embodiment of the present invention, the whole level of the input signal Si is adjusted so as to make the noise level of the input signal Si equal to or lower than the predetermined level Vnref. Therefore, if the input signal Si from the tuner 51, the input signal Si from the CD player 52 and the input signal Si from the cassette deck 53 are different in level from each other, the noise component contained in each input signal Si can be effectively reduced by one noise reduction portion 3. Accordingly, it is possible to simplify the construction of the information reproducing apparatus 100, and sound obtained from various types of the audio components can be made clear.

Furthermore, according to the information reproducing apparatus 100, it is possible to sufficiently reduce the noise, since the noise reduction portion 3 divides the input signal Si into four components whose frequency bands are different from each other.

Moreover, the inverse number of the attenuation factor Ga is used as the amplification factor Gb, the amplification factor Gb can be calculated easily. Therefore, it is possible to restore the whole level of the input signal Si to the former level easily.

Furthermore, it is possible to detect the noise level of the input signal Si accurately, since the sound existing part of the input signal Si is detected and the noise level detection is only performed on the sound existing part.

In addition, although the information reproducing apparatus 100 has the three audio components: the tuner 51, the CD player 52 and the cassette deck 53, the present invention is not limited to this. For example, an MD player, a DVD player, an LD (Laser disk) player, a DAT (Digital Audio Tape) player, DCC (Digital Compact Cassette) player, etc. may be mounted on and connected with the information reproducing apparatus 100.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-310231 filed on Nov. 12, 1997 including the specification, claims, drawings and summary is incorporated herein by reference in its entirety.

What is claimed is:

1. A noise reduction apparatus which reduces a noise level of noise contained in an input signal, comprising:
   a high pass filter which extracts a high filter frequency component of the input signal from the input signal;
   a detecting device which detects the noise level of the noise from the input signal by use of the high frequency component of the input signal;
   a gain controlling device which generates a first control signal and a second control signal on the basis of the detected noise level, the first control signal being used for adjusting a level of the input signal so as to make the detected noise level equal to a predetermined threshold level, and the second control signal being used for adjusting a level of a reduced adjusted signal so as to restore the level of the reduced adjusted signal to an original level of the input signal;
   an adjusting device which adjusts the level of the input signal that does not pass the high pass filter on the basis of the first control signal;
   a reducing device which reduces a level of the adjusted input signal in accordance with a predetermined reducing characteristic and generates the reduced adjusted signal; and,
   a restoring device which restores the level of the reduced adjusted signal to the original level of the input signal on the basis of the second control signal.

2. The noise reduction apparatus according to claim 1, wherein said detecting device comprises:
   a rectifying device which rectifies the extracted high frequency component;
   an envelope signal generating device which generates an envelope signal of the extracted high frequency component; and
   a level analyzing device which detects a lowest level of the envelope signal.

3. The noise reduction apparatus according to claim 1, wherein said detecting device comprises:
   a sound existing part detecting device which detects a sound existing part of the input signal; and
   a noise level detecting device which detects the noise level of the noise contained in the sound existing part.

4. The noise reduction apparatus according to claim 1, wherein said adjusting device comprises:
   a determining device which determines whether or not the noise level of the noise is higher than the predetermined threshold level; and
   a level adjusting device which adjusts the level of the input signal so as to make the noise level equal to the predetermined threshold level if said determining device determines that the noise level is higher than the predetermined threshold level.

5. The noise reduction apparatus according to claim 1, wherein said reducing device comprises:
   a dividing device which divides the adjusted input signal into a plurality of divisional components whose frequency bands are different from each other;
   a plurality of signal level detecting devices, each of which detects a level of one of the divisional components;
   a plurality of attenuating devices, each of which attenuates one of the divisional components on the basis of the detected level of the corresponding divisional component;
   a mixing device which mixes all of the attenuated divisional components.

6. The noise reduction apparatus according to claim 1, wherein said adjusting device comprises an attenuator, and said restoring device comprises an amplifier.

7. The noise reduction apparatus according to claim 6, wherein said amplifier amplifies the reduced adjusted signal by using an inverse number of an attenuation factor of said attenuator as an amplification factor.

8. The noise reduction apparatus according to claim 1, wherein
   the gain controlling device does not generate the first control signal and the second control signal in case the detected noise level is smaller than the Predetermined threshold level.

9. A noise reduction method which reduces a noise level of noise contained in an input signal, comprising:
   a high pass filtering process which extracts a high frequency component of the input signal from the input signal;
   a detecting process which detects the noise level of said noise from the input signal by use of the high frequency component of the input signal;
   a gain controlling process which generates a first control signal and a second control signal on the basis of the detected noise level, the first control signal being used for adjusting a level of the input signal so as to make the detected noise level equal to a predetermined threshold level, and the second control signal being used for adjusting a level of a reduced adjusted signal so as to restore the level of the reduced adjusted signal to an original level of the input signal;
   an adjusting process which adjusts the level of the input signal that does not pass the high pass filter on the basis of the first control signal;
   a reducing process which reduces a level of the adjusted input signal in accordance with a predetermined reducing characteristic and generates the reduced adjusted signal; and
   a restoring process which restores the level of the reduced adjusted signal to the original level of the input signal on the basis of the second control signal.

10. The noise reduction method according to claim 9, wherein said detecting process comprises:
    a rectifying process which rectifies the extracted high frequency component;
    an envelope signal generating process which generates an envelope signal of the extracted high frequency component; and
    a level analyzing process which detects a lowest level of the envelope signal.

11. The noise reduction method according to claim 9, wherein said detecting process comprises:
    a sound existing part detecting process which detects a sound existing part of the input signal; and
    a noise level detecting process which detects the noise level of the noise contained in the sound existing part.

12. The noise reduction method according to claim 9, wherein said adjusting process comprises:
    a determining process which determines whether or not the noise level of the noise is higher than the predetermined threshold level; and
    a level adjusting process which adjusts the level of the input signal so as to make the noise level equal to the predetermined threshold level if it is determined in said determining process that the noise level is higher than the predetermined threshold level.

13. The noise reduction method according to claim 9, wherein said reducing process comprises:
    a dividing process which divides the adjusted input signal into a plurality of divisional components whose frequency bands are different from each other;
    a detecting process which detects a level of each of the divisional components;
    a attenuating process which attenuates each of the divisional components on the basis of the detected level of the corresponding divisional component;
    a mixing process which mixes all of the attenuated divisional components.

14. The noise reduction method according to claim 9, wherein
    the gain controlling process does not generate the first control signal and the second control signal in case the detected noise level is smaller than the predetermined threshold level.

* * * * *